United States Patent [19]

Gray et al.

[11] Patent Number: 4,868,776

[45] Date of Patent: Sep. 19, 1989

[54] FAST FOURIER TRANSFORM ARCHITECTURE USING HYBRID N-BIT-SERIAL ARITHMETIC

[75] Inventors: Joseph H. Gray, Palo Alto, Calif.; Mark R. Greenstreet, Princeton, N.J.; Lars M. Jorgensen, San Jose, Calif.

[73] Assignee: TRW Inc., Redondo Beach, Calif.

[21] Appl. No.: 59,097

[22] Filed: Sep. 14, 1987

[51] Int. Cl.[4] .................................. G06F 15/332
[52] U.S. Cl. ................................................ 364/726
[58] Field of Search ................ 364/726, 715, 748, 754

[56] References Cited

U.S. PATENT DOCUMENTS

| | | | |
|---|---|---|---|
| 4,275,452 | 6/1981 | White | 364/726 |
| 4,282,579 | 8/1981 | Speiser et al. | 364/726 |
| 4,298,950 | 11/1981 | Smith, Jr. | 364/726 |
| 4,547,862 | 10/1985 | McIver et al. | 364/726 |
| 4,602,350 | 7/1986 | Gray | 364/726 X |

OTHER PUBLICATIONS

H. L. Groginsky & G. A. Works, "A Pipeline Fast Fourier Transform," IEEE Trans. on Computers, vol. C-19, No. 11, pp. 1015–1019, 1970.

*Primary Examiner*—Gary V. Harkcom
*Assistant Examiner*—Tan V. Mai
*Attorney, Agent, or Firm*—Noel F. Heal; Benjamin DeWitt

[57] ABSTRACT

A fast Fourier transform circuit, including an illustrative radix-eight discrete Fourier transform (DFT) kernel that operates on an n-bit-serial data format, for an efficient serial-like, pipelined operation within the DFT. The circuit performs a four-point DFT on half of the input data words at a time, stores intermediate results from the four-point DFT in a commutation stage, then combines the intermediate results in two two-point DFTs. Internal multiplication in the eight-point DFT is effected in delay registers that also serve to store the intermediate results, thereby providing an economy of timing and circuit routing. Interleaving and deinterleaving operations convert the data format between three-bit-serial and conventional bit-parallel used outside the eight-point DFT kernel, which may therefore be easily cascaded for more complex FFT operations. The DFT kernel also includes means for selectively bypassing butterfly computation modules to perform shorter-length DFTs.

24 Claims, 5 Drawing Sheets

FAST FOURIER TRANSFORM ARCHITECTURE USING HYBRID N-BIT-SERIAL ARITHMETIC

CROSS-REFERENCE TO RELATED APPLICATION

The application is related to a co-pending application by the same inventors entitled "Squared-Radix Discrete Fourier Transform", Ser. No. 674,624, filed on Nov. 26, 1984, now U.S. Pat. No. 4,768,159.

BACKGROUND OF THE INVENTION

This invention relates generally to digital signal processing techniques and, more particularly, to improvements in hardware for implementing the algorithm known as the fast Fourier transform. Fourier transformation is a well known technique for analysis of time-varying signals. In simple terms, Fourier transformation converts a signal from a time-varying one, said to be "in the time domain," to a frequency-varying one, said to be "in the frequency domain." Fourier transforms are used extensively in spectrum analysis and related applications.

When a signal is expressed in discrete form, i.e. by a series of successive signal samples taken at regular time periods, the corresponding Fourier transformation is referred to as the discrete Fourier transform, or DFT.

The basic DFT equation is:

$$X(k) = \sum_{n=0}^{N-1} x(n) W_N^{nk} \text{ for } k = 0,1,2, \ldots (N-1) \quad (1)$$

where W is defined as:

$$W_N^{nk} = e^{j\frac{2\pi nk}{N}} \quad (2)$$

and where:
 x(n)=a set of n signal samples, and
 X(k)=a corresponding set of output signals comprising the DFT.

This is referred to as an N-length DFT. The fast Fourier transform, or FFT, is a set of mathematical algorithms that drastically reduce the number of arithmetic computations for processing DFTs. Using a "squared-radix" FFT algorithm, two N-length DFTs can be combined to generate an FFT of length of $N^2$.

From equation (1), the $N^2$-length DFT is defined as:

$$X(k) = \sum_{n=0}^{N^2-1} x(n) W_{N^2}^{nk} \text{ for } k = 0,1,2 \ldots (N^2-1) \quad (3)$$

The radix-squared DFT is derived by redefining the indices n and k as:

$$n = Nn_1 + n_2 \text{ for } n_1, n_2 = 0,1,2, \ldots (N-1) \quad (4)$$

$$k = k_1 + Nk_2 \text{ for } k_1, k_2 = 0,1,2, \ldots (N-1) \quad (5)$$

Substituting equations (4) and (5) into equation (1), and noting that $$W_{N^2}^{Nn_1 Nk_2} = 0,$$

yields:

$$X(k_1 + Nk_2) = \sum_{n_2}^{N-1} \sum_{n_1}^{N-1} x(Nn_1 + n_2) W_{N^2}^{(Nn_1+n_2)(k_1+Nk_2)} \quad (6)$$

$$= \sum_{n_2}^{N-1} W_{N^2}^{n_2 k_1} \left[ \sum_{n_1}^{N-1} x(Nn_1 + n_2) W_N^{n_1 k_1} \right] W_N^{n_2 k_2}$$

The term in brackets is an N-length DFT on the data addressed by $n_1$. The second summation is the N-sample DFT of the data in brackets after it has been multiplied by the twiddle factors given by $$W_{N^2}^{n_2 k_1}.$$

A block diagram of this process is shown in FIG. 1.

It will be appreciated that the radix-squared FFT can be further extrapolated to an $N^4$-length FFT, and beyond if desired, provided that the basic "building blocks" are available. In particular, the basic N-length DFT kernel should provide high speed and simplicity of design. A fundamental issue affecting the DFT architecture is the representation of the data. Two methods for representing numerical data have been used extensively in existing systems: bit-parallel and bit-serial arithmetic with bit-parallel arithmetic, all of the bits representing a number are presented to the computational device in one cycle; likewise, the device outputs all of the bits of the result in one cycle. Most commercially available multipliers and other arithmetic components are implemented in bit-parallel arithmetic. With bit-serial arithmetic, the bits representing the numbers are presented at the rate of one bit per cycle to the arithmetic components, and the results are also generated at the rate of one bit per cycle.

In the design of a DFT processor, the bit-parallel representation of the data is most convenient for the data permutations that must be effected outside of the DFT kernels. When the data is permuted, the bits within a single data word retain the same relationship to one another. Thus all of the bits of the data word are handled identically. For a system that uses large-scale memories to permute the data, all of the bits can be accessed with the same address. This dramatically simplifies the address generation and other control circuitry for the memories. Another advantage of bit-parallel arithmetic is that this is the format most commonly implemented in commercially available components. Thus, a DFT processor built using bit-parallel arithmetic can be more easily used in combination with components from other sources.

The bit-parallel representation has several disadvantages within the DFT kernel. Typical arithmetic operations, such as addition and multiplication, require that the results from the computation of the lesser significant bits affect the correct results for the more significant bits. Thus, if a bit-parallel operator is to complete an operation in a single cycle, the cycle must be long enough to allow intermediate results to propagate from the least significant bit to the most significant bit. Thus, the speed of a bit-parallel system can be seriously impaired for systems with large data words, i.e. for systems of high precision.

Another disadvantage of the bit-parallel approach is that it does not facilitate the use of word-parallel computations. Word-parallel computation refers to architecture in which several computations are performed on several combinations of data words each cycle. This approach allows the construction of a much faster processor than would otherwise be possible. Furthermore, because different operations are performed by different components, it is possible to design each of the components to be specialized for a specific task. This allows the components to be simpler. For example, a component that multiplies by a predetermined constant is simpler than a multiplier that must be able to multiply by an arbitrary number. With bit-parallel arithmetic, it is difficult to utilize word-parallel computation. Each data path in a bit-parallel architecture requires a number of wires equal to the number of bits in the word. Thus, for D data paths with words of B bits, there are $D \times B$ connections to the input of each DFT kernel and $D \times B$ connections to the output. It is readily seen that, for practical values of B (greater than 12), D must be quite small, or the connection problem becomes intractable, either with the DFT implemented as a VLSI (very large-scale integrated) circuit component, requiring 2DB pins, or as a circuit card with the same number of external connections to other cards.

Bit-serial arithmetic is much better suited for the computation within the DFT kernel. With $B=1$, word parallelism is easily exploited. Furthermore, bit-serial structures have been developed so that intermediate results must only be propagated across one bit of data each cycle. Thus, bit-serial processors may operate with very high cycle rates.

Bit-serial arithmetic presents several problems in the development of a DFT processor. Word parallelism must be exploited to obtain high data rates through the processor. Therefore, the DFT kernel outputs several data-streams simultaneously, each of which must be handled differently. This makes the control of the memories that implement the permutations between kernels much more complicated. Furthermore, each intermediate result, such as a carry, must be stored each cycle. This results in a large portion of the kernel circuitry being used for the storage of intermediate results.

One proposed solution to the difficulty of compromise between the bit-serial and the bit-parallel formats is to employ in the DFT an architecture known as bit-skew arithmetic. This approach retains a similarity with bit-parallel, in that there are as many input lines as there are bits in a data word, but the timing of the inputs is skewed by one bit per stage. At the least-significant stage, the first bit of the first word is input. Then, in the next clock cycle, the first bit of the second word is input at the least significant stage, while the first bit of the second data word is being input at the next least significant stage. This process has the advantage of preserving some of the parallelism of a bit-parallel system, while affording some of the advantages of a bit-serial system. One disadvantage is that carry signals have to be propagated from stage to stage, as in a bit-parallel system.

It is apparent that there is still a need for improvement in the area of DFT architectures. Ideally, what is needed is a system that preserves the advantages of bit-parallel arithmetic outside of the DFT kernel, but has substantially the same advantages as the bit-serial approach within the kernel. The ideal approach should also preserve the ordering of the data inputs between input and output of the DFT, to facilitate cascading of stages without the use of double buffering or complex memory addressing schemes. The present invention fulfills all of these requirements and provides additional advantages to be described.

SUMMARY OF THE INVENTION

The present invention resides in a discrete Fourier transform (DFT) module employing a hybrid form of processing that is neither bit-serial nor bit-parallel, within a DFT kernel processor. The processing within the DFT kernel may be referred to as n-bit serial, where the number of bits in each data word is a multiple of n. In the presently preferred embodiment of the invention, $n=3$ and the processing within the DFT kernel is performed on a three-bit-serial basis. This means that data is input to the kernel on a set of three parallel lines for each of a plurality of data words. In each clock cycle, three bits are input for each data word in the set of data words being processed. The number of clock cycles to input a complete set of data words is equal to the number of bits in a data word divided by n. In the illustrative embodiment of the invention, n is three, data words are twenty-four bits long within the DFT kernel, and eight clock cycles are needed to input a full set of data words.

Another important aspect of the DFT kernel of the invention is that only half of the input data words are input in parallel. In the illustrative embodiment, the DFT kernel performs an eight-point DFT and there are, therefore, eight complex data input words, i.e. sixteen data input words in all, eight real components and eight imaginary components. In the DFT kernel structure of the invention, only eight of the data words are input in parallel; then the other eight are input to the same hardware. The first eight data words are processed through two stages of butterfly elements, to generate intermediate results that are stored in shift registers, some of which incorporate necessary multiplier logic to effect internal multiplication for some of the butterfly elements. When the second eight data items are input, they are also processed through the first two stages of butterfly elements, and then combined with the stored intermediate results for processing by the final butterfly stage. The key structural features that make this possible are embodied in a commutation stage for selectively interchanging intermediate result lines between butterfly stages. Some of the delay registers serve the dual purpose of internal multiplication and delay of the first set of intermediate results. The remaining delay registers serve to synchronize operations of the DFT kernel and to ensure that all of the intermediate results are properly synchronized when presented to the inputs of the final butterfly stage.

When the inputs are presented to the DFT kernel in backwards-bit-reversed order, there are only two intermediate results that require multiplication by a quantity other than $-i$, where i is the square root of $-1$. These multiplies are performed after the first two butterfly stages, on the first set of eight input words. Other internal multiplies, by $-i$, are conveniently effected by interchanging real and imaginary components and negating one of these components.

In general terms, the DFT kernel of the invention includes a first and second butterfly stages defining a four-point DFT, a commutation stage including delay registers and internal multipliers, and a third butterfly stage defining two two-point DFTs. Data enters the DFT kernel in three-bit-serial format. The first eight data words to enter are the real and imaginary components of the first four complex data values taken in backwards-bit-reversed sequence, i.e. the real and imaginary components of X(1), X(5), X(3) and X(7), where X(n) represents an input data value. In the first eight clock cycles, the four-point DFT is performed on these inputs, and the results are stored in registers in the commutation stage. The four-point DFT and the commutation stage include means for multiplying intermediate results by multipliers known as twiddle factors. During the following eight clock cycles, the four-point DFT receives as inputs the real and imaginary components of the remaining four complex data inputs, i.e. X(0), X(2), X(4) and X(6). At the same time, the commutation stage is switched to a condition in which selected intermediate results from the second operation of the four-point DFT are transmitted directly to the two two-point DFTs, together with selected stored intermediate results from the first operation of the four-point DFT, such that the final stage of the kernel outputs four complex result quantities. Finally, in the following eight clock cycles the remaining intermediate results stored after the first and second operations of the four-point DFT are output from the delay registers to the two two-point DFTs, to produce the second four complex result quantities.

This configuration for the kernel DFT provides a relatively simple and efficient technique for computing an eight-point DFT. There is an economy of hardware usage by employing a four-point DFT on two successive occasions, but without significant waste of time. The delays necessitated by the internal multiplications by twiddle factors are also employed to provide intermediate storage between the two uses of the four-point DFT. In addition, the use of three-bit-serial arithmetic affords simplified control and routing within the DFT kernel hardware, and does not suffer from the disadvantages of bit-serial, bit-parallel and bit-skew architectures. To employ the three-bit-serial approach in a system in which eight-point FFTs are cascaded, ideally requires that the ordering of input quantities be the same as the ordering of the output quantities, and that computations outside of the DFT module be performed in bit-parallel fashion. These requirements are satisfied by another aspect of the invention, namely the inclusion of conversion modules for converting between the three-bit-serial format and the bit-parallel format that is desirable for use outside of the FFT module. The process for converting from bit-parallel to three-bit-serial format is referred to as interleaving, and the reverse process is referred to as deinterleaving.

In accordance with this aspect of the invention, an interleaver includes means for receiving a plurality of data words on a plurality N of n-bit input lines in a bit-parallel, word-serial format, and at least one conversion stage, for converting the received data words to an intermediate format in which data word is divided into segments of 2n bits each, and the segments for any one data word are carried on N/2 lines. Additional conversion stages may be used to continue this process. If a second stage is used, it outputs segments of 4n bits carried on N/4 lines. After a total of s stages, the interleaver outputs segments of $2^s \times n$ bits on $N/(2^s)$ lines.

The term segment in this context may be defined as a set of bits originating from one data word, and carried on a given n-tuple of wires, possibly sequential over a series of intervals. In the illustrative embodiment of the invention, the final conversion stage converts the data words to full-word segments, each carried on a single n-bit line.

In the preferred embodiment of the invention, data is input as sixteen successive 24-bit words and the output of the interleaver is to be three-bit-serial. For simplicity, it is assumed that the input lines are eight three-bit lines. In the first stage of conversion, each word is converted to six-bit segments, i.e. a word appears as two three-bit segments in series on each of four lines. In the next stage, the conversion produces words in 12-bit segments, i.e. each word will appear as four three-bit segments in series on each of two lines. In the final stage of conversion, each word is converted to a full 24-bit segment on a single line, i.e. each of the eight lines carries a data word in three-bit-serial format. Since there are sixteen data words in all, to accommodate eight complex data words, the eight lines carry a first set of eight data words and then, in series, a second set. When the input data is in backwards-bit-reversed format (7, 3, 5, 1, 6, 2, 4, 0), the first set of outputs from the interleaver includes the words 7, 3, 5 and 1, and the second set includes the remaining four.

The deinterleaver operates in an inverse manner to the interleaver, receiving a three-bit-serial stream of data on eight three-bit data lines, and converting it back to a conventional bit-parallel form. The conversion is again made in a number of stages. An additional stage is used to restore the backwards-bit-reversed order of the data. Therefore, the outputs from the deinterleaver will be in the same backwards-bit-reversed order as the original inputs to the interleaver.

The entire radix-eight DFT module includes at its input a floating-point to fixed-point converter, to convert the input data words to a fixed-point form, which is more convenient for DFT processing, and an interleaver to convert the fixed-point data to three-bit-serial format. The output of the interleaver is connected to the DFT kernel, the output of which is connected to a deinterleaver Finally, the deinterleaver output is connected to a fixed-point to floating-point converter, to convert the final DFT results back to the original floating-point format for further manipulation.

Another advantage of the DFT kernel architecture of the invention is that the butterfly modules may be conveniently implemented in a manner that uses fewer components than are usually used to perform addition and subtraction functions on two input quantities.

A further advantage is that the butterfly modules may be selectively bypassed, for two important purposes. One is for testing of the kernel circuitry, and the other is for performing shorter-length DFT functions using the same circuitry, but without rewiring or using different components.

It will be appreciated from the foregoing that the present invention represents a significant advance in the field of FFT circuitry. In particular, the invention successfully addresses a number of problems that have long been posed for designers of FFTs. First, the use of bit-parallel inputs and outputs to a basic FFT module allows the module to be conveniently coupled to other computational circuitry, such as multipliers and memories. Yet the internal use of a three-bit-serial format simplifies the internal structure of the DFT kernel, and avoids the disadvantages of bit-serial and bit-parallel formats for internal computation. The use of a backwards-bit-reversed data word order for input and output facilitates cascading of FFT units. Moreover, the use of this order for input, in combination with the structure of the kernel, makes efficient use of the twiddle factor multiplication delay and reduces the complexity of the kernel. The arrangement also allows most multiplications to be performed with hard wiring and commutation switches. Finally, the kernel configuration permits selective bypassing of the butterfly elements to provide for shorter-length DFT computations.

Other aspects and advantages of the invention will become apparent from the following more detailed description, taken in conjunction with the following drawings.

BRIEF DESCRIPTION OF THE DRAWINGS

FIG. 5b is a one-bit add-subtract circuit used in the three-bit add-subtract unit of FIG. 5a;

DESCRIPTION OF THE PREFERRED EMBODIMENT

Overview

Figure 1:
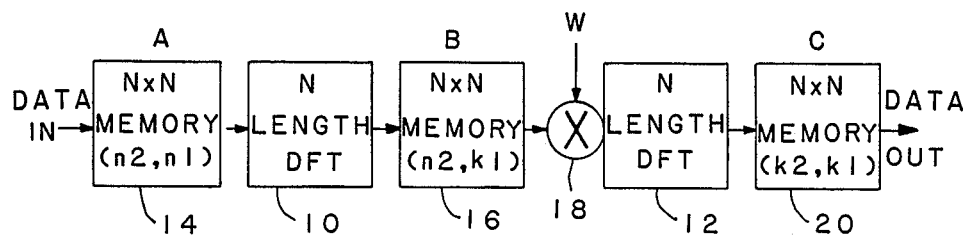
FIG. 1 is a block diagram of an $N^2$ FFT including two N-length DFTs.

As shown in the drawings for purposes of illustration, the present invention is concerned with fast Fourier transform (FFT) circuitry. The advantages of the FFT in performing digital signal processing are well known, but there is still need for improvement in minimizing the size of FFT circuitry and in providing a basic FFT module that can be usefully employed as a "building block" in the design and fabrication of more complex FFTs. One disadvantage of available FFTs is that they employ either bit serial or bit-parallel arithmetic, neither of which is completely satisfactory.

In accordance with the invention, an N-point DFT is constructed to operate on a hybrid data format that is neither bit-serial nor bit-parallel. The illustrative format of the preferred embodiment is three-bit-serial, i.e. data words are processed three bits at a time rather than one bit at a time or all bits at a time. This novel approach preserves the advantages of parallelism outside the basic DFT module, but permits a desirable serial type of operation within the module. This leads to significant advantages within the DFT module, as will be discussed in detail.

FIG. 1 shows by way of example how two N-point DFT modules, indicated by reference numerals 10 and 12, can be cascaded to form an $N^2$ FFT. Input data first enters an $N \times N$ memory 14, from which data words are transmitted to the first N-length DFT 10. Output data words from the first DFT 10 are input to an intermediate $N \times N$ memory 16, and are read from there into a complex multiplier 18, the outputs from which are fed to the second DFT module 12. Finally, the data words output from the second DFT 12 are processed through another NxN memory 20 for proper sequencing of the data. This modular approach can be extended to an N4-length FFT, comprising two $N^2$-length FFTs like the one shown in FIG. 1, together with three $N^2 \times N^2$ memories and another complex multiplier.

Figure 2:
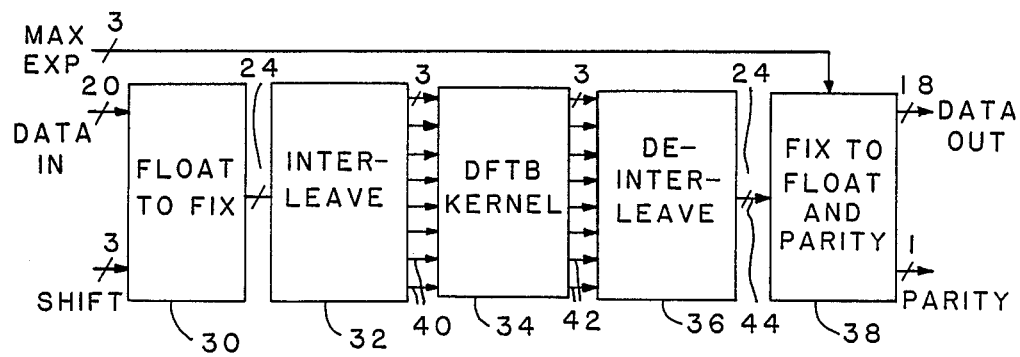
FIG. 2 is a block diagram of an 8-point DFT in accordance with the invention.

In this type of modular FFT design, the architecture of the N-length DFT is of critical importance. Prior approaches have employed bit-serial or bit-parallel logic in the DFT, neither of which is completely satisfactory. FIG. 2 shows the approach used in the present invention, using an eight-point DFT by way of example. The eight-point DFT includes a floating-point to fixed-point converter 30, an interleaver 32, an 8-point DFT kernel 34, a deinterleaver 36, and a fixed-point to floating-point converter 38. In the preferred embodiment of the invention, the DFT module shown in FIG. 2 operates in conjunction with a complex multiplier that performs a scan of exponent values of the data words, and determines for each word a shift value that would be needed to convert the word to a common exponent base. The floating-to-fixed converter 30 basically performs a shifting operation to convert each data word to the common exponent. The data words are output from the converter 32 in a 24-bit format that may be regarded as a fixed-point integer format.

In the interleaver 32, which will be discussed in more detail, the data words are converted from a bit-parallel, word-serial format to a three-bit-serial format. There are eight 3-bit lines 40 output from the interleaver 32, and the data words leave the interleaver in a format that can best be described as eight-word-parallel and three-bit-serial. The first output on these lines 40 consists of the three least significant bits of the first eight data words in a predetermined sequence. Then the next three significant bits of the same words follow, and so forth until the three most significant bits of the same data words are output. The process is repeated for the eight remaining data words, since there are sixteen data words in all in the input to a complex 8-point DFT.

The lines 40 are input to the DFT kernel 34, the operation of which will be further described in detail. Output from the DFT kernel 36 is over eight 3-bit lines 42, in the same format as the input, but not in the same data order. These lines 42 are input to the deinterleaver 36, which converts the format back to a conventional bit-parallel one on a 24-bit output line 44. Output data words on line 44 are input to the fixed-point to floating-point converter 38, which applies appropriate shifts to the output data words, and generates exponents to provide a floating-point output from the kernel.

The DFT Kernel

Figure 3A:
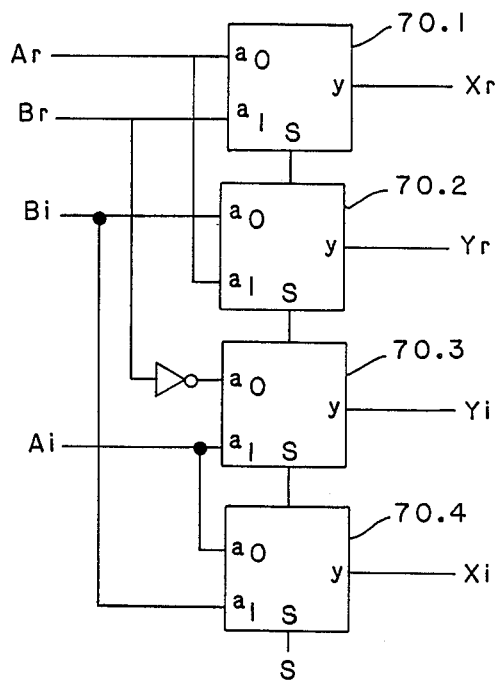
FIG. 3a is a more detailed schematic diagram of one of the i-commutators of FIG. 3.
Figure 3:
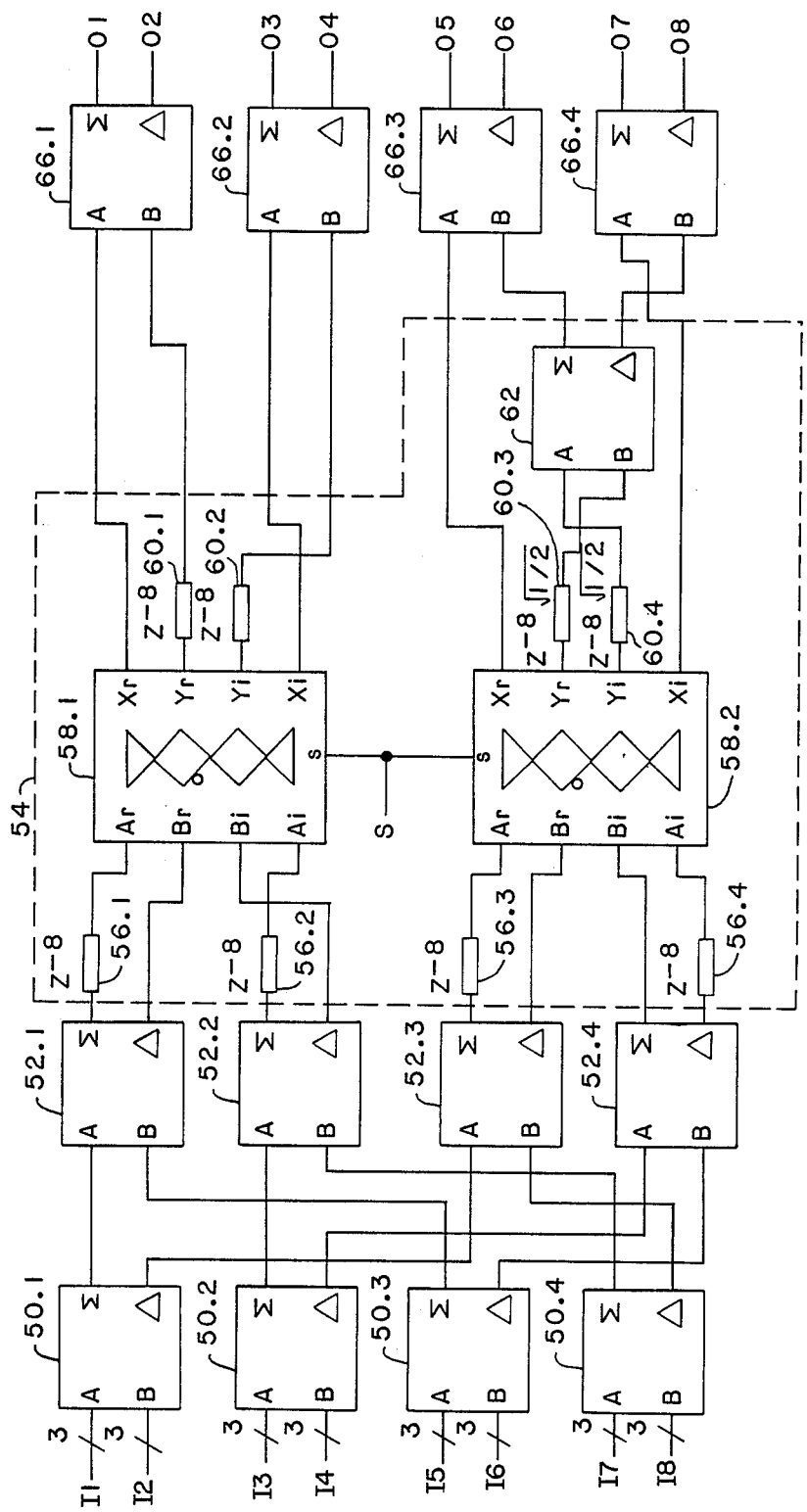
FIG. 3 is a more detailed block diagram of the 8-point DFT kernel included in FIG. 2.

The DFT kernel 34 of FIG. 2 is shown in more detail in FIG. 3. The kernel has eight three-bit input lines, designated I1 through I8, and eight three-bit output lines, designated O1 through O8. The kernel includes a first butterfly stage of four add-subtract units 50.1, 50.2, 50.3 and 50.4, and a second butterfly stage also comprising four add-subtract units 52.1, 52.2, 52:3 and 52.4. Each add-subtract unit 50 or 52 is a three-bit arithmetic unit capable of producing a sum output ($\Sigma$) and a difference output ($\Delta$) from two three-bit inputs, indicated by the letters A and B.

The add-subtract units 50 and 52 together form a four-point FFT to which the inputs I1–I8 are connected. Specifically, inputs I1 and I2 are connected to the A and B inputs, respectively, of unit 50.1, I3 and I4 are connected to the A and B inputs of unit 50.2, I5 and I6 are connected to the A and B inputs of unit 50.3, and I7 and I8 are connected to the A and B inputs of unit 50.4. The outputs of the add-subtract units 50 are connected to the A and B inputs of the add-subtract units 52 in the following manner. The sum outputs of units 50.1 and 50.2 are connected to the A inputs of units 52.1 and 52.2, respectively. The sum outputs of units 50.3 and 50.4 are connected to the B inputs of units 52.1 and 52.2, respectively. The difference outputs of units 50.1 and 50.2 are connected to the A inputs of units 52.3 and 52.4, respectively. Finally, the difference outputs of units 50.3 and 50.4 are connected to the B inputs of units 52.4 and 52.3, respectively.

The outputs of the second butterfly stage are connected to a commutation stage, indicated generally by reference numeral 54. The commutation stage 54 includes four eight-cycle delay units 56.1 through 56.4, two special commutators 58.1 and 58.2, four additional eight-cycle delay units 60.1 through 60.4, and an add-subtract unit 62. The output stage of the DFT consists of two two-point DFTs made up of four add-subtract units 66.1 through 66.4.

The special commutators 58.1, 58.2 each have four inputs ($A_r$, $A_i$, $B_r$, $B_i$) and outputs ($X_r$, $X_i$, $Y_r$, $Y_i$). Each commutator can effect one of two permutations. With the first permutation, the data at the $A_r$ input is transferred to $X_r$, $A_i$ is transferred to $X_i$, $B_r$ is inverted and transferred to $Y_i$, and $B_i$ is transferred to $Y_r$. With the other permutation, the $A_r$ input is transferred to $Y_r$, $A_i$ is transferred to $Y_i$, $B_r$ is transferred to $X_r$, and $B_i$ is transferred to $X_i$. The inversion of $B_r$ for the first permutation effects a negation of the data. This negation is exact for one's complement data. For two's complement data, as used in the preferred embodiment of the invention, it is necessary to add one to the inverted data to obtain exact negation. This is accomplished utilizing the carry and/or borrow inputs for the least significant bit at the subsequent adder or adder/subtractor units. This special manipulation of the B data when transferring it to the Y outputs effects a multiplication by $-i$, which is needed for the FFT calculations. These special commutators will subsequently be referred to as i-commutators.

The sum output of unit 52.1 is connected to the input of delay unit 56.1, the output of which is connected as the $A_r$ input of the i-commutator 58.1. The difference output of unit 52.1 is connected directly to the $B_r$ input of i-commutator 58.1. Likewise, the sum output of unit 52.2 is connected through delay unit 56.2 to the $A_i$ of i-commutator 58.1, and the difference output of unit 52.2 is connected directly to the $B_i$ input of i-commutator 58.1.

The $X_r$ output of i-commutator 58.1 is connected to the A input of the last-stage add-subtract unit 66.1, and the $X_i$ output of unit 58.1 is connected to the A input of unit 66.2. The $Y_r$ output if i-commutator 56.1 is connected to the input of delay unit 60.1, the output of which is connected to the B input of unit 66.1, and the $Y_i$ output of i-commutator 58.1 is connected through delay unit 60.2 to the B input of unit 66.2.

The sum and difference outputs of unit 52.3 are connected to the $A_r$ and $B_r$ inputs of i-commutator 58.2 using delay unit 56.3, in the same way that the outputs of unit 52.1 were connected to unit 58.1. Similarly, the outputs of unit 52.4 are connected to the $A_i$ and $B_i$ inputs of unit 58.2 using delay unit 56.4, but there is a critical difference. The delay unit 56.4 is installed in the difference output line from unit 52.4, rather than the sum output line. This compensates for the reversed sign of the B input of adder-subtractor 52.4 due to the method of implementing the W(4) twiddle factors.

The $X_r$ output of i-commutator 58.2 is connected to the A input of the last-stage add-subtract unit 66.3, and the $X_i$ output of unit 58.2 is connected to the A input of unit 66.4. The $Y_r$ output of i-commutator 58.2 is connected to the input of delay unit 60.3, and the $Y_i$ output of unit 58.2 is connected to the input of delay 60.4. Delay units 60.3 and 60.4 also perform a multiplication function. Each multiplies the delayed quantity by the square root of $\frac{1}{2}$. Since the delay and multiplication functions are combined in the delay units 60.3 and 60.4, the latency of pipelined multipliers is conveniently utilized by the DFT kernel architecture. Furthermore, as the multiplications are by a single constant, very efficient multiplication structures may be utilized.

The outputs of delay units 60.3 and 60.4 are connected to the B and A inputs, respectively, of adder-subtractor 62. The sum and difference outputs of unit 62 are connected to the B inputs of adder-subtractors 66.3 and 66.4, respectively. The outputs O1 through O8 are derived from the sum and difference outputs of the last-stage add-subtract units 66.1 through 66.4.

Operation of the DFT Kernel

Operation of the DFT kernel shown in FIG. 3 may be best understood from the conventional data flow diagram of FIG. 4 and from the Table 1, below, showing the signals present at the inputs and outputs during twenty-four clock cycles of operation:

TABLE 1

| Cycles | I1 | I2 | I3 | I4 | I5 | I6 | I7 | I8 | O1 | O2 | O3 | O4 | O5 | O6 | O7 | O8 |
|---|---|---|---|---|---|---|---|---|---|---|---|---|---|---|---|---|
| 0–7: | X1r | X5r | X1i | X5i | X3r | X7r | X3i | X7i | | | | | | | | |
| 8–15: | X0r | X4r | X0i | X4i | X2r | X6r | X2i | X6i | Y2r | Y6r | Y2i | Y6i | Y3r | Y7r | Y3i | Y7i |
| 16–23: | | | | | | | | | Y0r | Y4r | Y0i | Y4i | Y1r | Y5r | Y1i | Y5i |

X0 through X7 are complex input data words, each having real and imaginary components Xnr and Xni, such that $Xn = Xnr + iXni$, where i is the square root of $-1$. Similarly, Y0 through Y7 are complex output data words.

Figure 4:
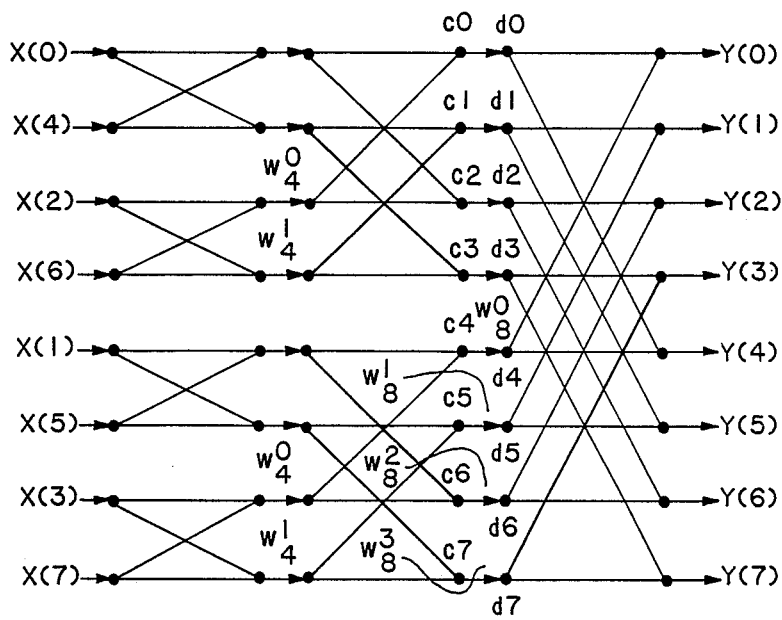
FIG. 4 is a data flow diagram for an eight-point decimation-in-time FFT.

The conventional 8-point decimation-in-time data flow graph is shown in FIG. 4 as including three stages of four butterfly computation units, each of which is capable of handling complex quantities. In the convention used for such flow diagrams, each butterfly unit produces a sum output where two paths indicated by arrows converge, and a difference output where one of the converging paths has a "$-1$" legend to indicate negation. In this case, the sum outputs are on the upper output line of each butterfly and the difference outputs are on the lower output line of each butterfly. The arrowheads that have quantities next to them represent multipliers or "twiddle factors" that are applied to the complex quantities on the lines with the arrowheads.

In the system of FIG. 3, the lower four inputs of FIG. 4, namely X1, X5, X3 and X7 are input first and are processed through the first two stages of butterflies before the remaining inputs (X0, X4, X2 and X6 are input. This effects a saving in the number of components required, but without sacrifice of efficiency, as will shortly be appreciated. It happens that two of the twiddle factors, $W_4^0$ and $W_4^1$ can be handled without special multiplier hardware. $W_4^0$ is unity and $W_4^1$ is the quantity $-i$ (i being the square root of $-1$). Multiplication of a complex quantity by $-i$ has the effect of interchanging the real and imaginary components and changing the sign of the new real component. The interchange of real and imaginary components is effected in the DFT by a simple cross-connection in the wiring. For example, the difference output of add-subtract unit 50.4, which provides the difference $X3i-X7i$ during the first eight cycles, should logically be combined with another imaginary difference quantity, $X1i-X5i$, but for purposes of effecting a multiplication by $-i$ the real and imaginary components of $X3-X7$ are interchanged. Hence the difference signal $X3i-X7i$ is combined with the difference signal $X1r-X5r$ in unit 52.3, and $X3r-X7r$ is combined with $X1i-X5i$ in unit 52.4.

The effect of changing the sign of the B input to the butterfly may be compensated by interchanging the sum and difference outputs of the unit. In the illustrative embodiment, the commutators 58.3 and 58.4 are switched to opposite conditions to complete the multiplication by $-i$ in the lowest row of output from the first stage of butterflies.

For purposes of explanation, the outputs of the second butterfly stage in the eight-point DFT flow diagram of FIG. 4 will be referred to c0 through c7 from top to bottom of the diagram. The real and imaginary components of these quantities will be referred to c0r, c0i, and so forth. Likewise, the inputs to the third butterfly stage will be referred to as d0 through d7. Note that each d value is equal to the c value with the corresponding index multiplied by the appropriate twiddle factor. During the first eight cycles of operation, input quantities X1, X5, X3 and X7 will be processed, and butterfly stage 52.1 will produce the quantities c4, c5, c6 and c7. During the first eight cycles, the S input, which is connected to i-commutators 58.1 and 58.2, will be a logical zero. Comparing FIGS. 3 AND 4, and considering the function of the i-commutator will show that the following quantities will be stored in the delays 56 and 60 after the first eight cycles:

| 56.1 | 56.2 | 56.3 | 56.4 | 60.1 | 60.2 | 60.3 | 60.4 |
|------|------|------|------|------|------|------|------|
| c4r  | c4i  | c5r  | c5i  | c6i  | −c6r | c7i  | −c7r |

During the second period of eight cycles, X0, X2, X4 and X6 will be processed by the first two butterfly stages to produce the quantities c0, c1, c2 and c3. Also during the second eight cycles, the S input to the i-commutators (see FIG. 3) will be a logical "one." Thus c2r, which is produced by the difference output of add-subtract unit 52.1, will be presented to the A input of unit 66.1. Likewise, c2i will be presented to the A input of unit 66.2. Noting that d2 is equal to c2, and d6 is equal to the product of c6 and $-i$, it will be seen that add-subtract units 66.1 and 66.2 receive the proper inputs to generated outputs Y2 Nd Y6.

The flow of computations through the lower four paths is somewhat more complicated to trace because of the multiplication by $W_8^1$ and $W_8^3$. During the second period of eight cycles, the product of c7 and $W_8^3$ is presented to the B inputs of add-subtract units 66.3 and 66.4. The implementation of this calculation is described presently. $W_8^3$ is equal to $-i(1/\sqrt{2})(1-i)$. The multiplication by $-i$ has been accomplished by the i-commutator 58.2. Delay units 60.3 and 60.4 perform multiplications by $1/\sqrt{2}$ in addition to delaying the data by eight cycles. Thus, the A input to add-subtract unit 62 receives $-(1/\sqrt{2})c7r$, and the B input to the unit receives $(1/\sqrt{2})c7i$. It will be seen that the sum output of unit 62 is the proper value for d7r and that the difference output is d7i. The A inputs to units 66.3 and 66.4 are presented with d3r and d3i in a manner analogous to the A inputs to units 66.1 and 66.2. Thus, during the second period of eight cycles, add-subtract units 66.3 and 66.4 output Y3 and Y7.

The third set of actions effected during the second set of eight cycles are that delay units 56 and 60 are loaded with the values shown below:

| 56.1 | 56.2 | 56.3 | 56.4 | 60.1 | 60.2 | 60.3 | 60.4 |
|------|------|------|------|------|------|------|------|
| c0r  | c0i  | c1r  | c1i  | c4r  | c4i  | c5r  | c5i  |

During the third period of eight clock cycles, the S input to the i-commutators is a logical zero again, the same as its original value. In a manner similar to that describe above, Y0, Y1, Y4 and Y5 are output at this time. Furthermore, it is possible to enter the quantities X1, X3, X5 and X7 for the next Fourier transform to be computed. This overlapping of successive transforms allows this architecture to complete an eight-point transform every sixteen cycles, even though three periods of eight cycles are used for each transform. As sixteen cycles are required for the communication of the sixteen data words representing the eight complex complex numbers, this architecture allows an uninterrupted flow of data at the maximum possible rate.

During the third set of eight clock cycles, the remaining eight output words are processed through the circuitry, with the various commutators are switched back to their original position. The outputs generated are Y0, Y4, Y1 and Y5, as shown in Table 1.

FIG. 3a shows by way of further explanation how the i-commutators of FIG. 3 are constructed. Each of the commutator includes four multiplexers 70.1-70.4, all controlled by the same strobe signal s. Each of the multiplexers shown in FIG. 3a has two data inputs, designated a0 and a1, a strobe input s, and a selected output y. When the strobe signal s is 0, the a0 input is selected for output. When the strobe signal is 1, the al input is selected for output.

One multiplexer 70.1 receives signals Ar and Br as alternate inputs and produces a signal Xr at its output. A second multiplexer 70.2 receives the signals Bi and Ar at its inputs, and produces a signal Yr at its 30 output. The third multiplexer 70.3 receives the inverse of signal Br as one input and signal Ai as the other input, producing signal Yi as its output. The fourth multiplexer 70.4 receives signals Ai and Bi as inputs and produces signal Xi as its output. The truth table relating the inputs and output of the commutator is:

| s | Xr | Yr | Xi | Yi |
|---|----|----|----|----|
| 0 | Ar | Bi | Ai | $\overline{Br}$ |
| 1 | Br | Ar | Bi | Ai |

It is apparent from the truth table that the commutator switches signals from input to output in the manner shown diagrammatically in FIG. 3, selecting either of two interconnections. When s=0, the cross-connections are selected for the two middle output signals Yi and Yr, and the "straight-through" connections are selected for the two outside outputs Xr and Xi. When s=1, the cross-connections are selected for the upper pair of outputs Xr and Yr and for the lower pair of outputs Yi and Xi.

Add-Subtract Units

Figure 5A:
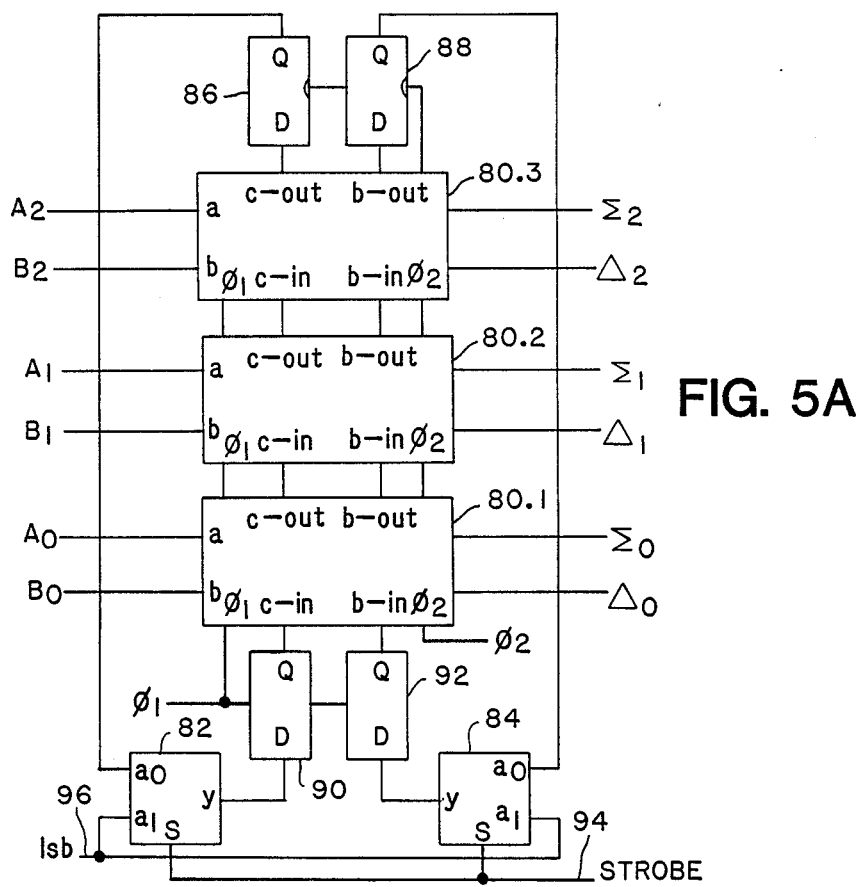
FIG. 5a is a three-bit add-subtract unit of the type used in the DFT kernel of FIG. 3.

FIG. 5a shows one of the three-bit add-subtract units used in the kernel of FIG. 3. Each add-subtract unit includes three one-bit add-subtract circuits 80.1, 80.2 and 80.3, two multiplexers 82 and and 84, and four flip-flops 86, 88, 90 and 92.

Each of the add-subtract circuits 80.1, 80.2, 80.3 has two one-bit inputs a and b, a sum output s, a difference output d, a carry input c-in, a carry output c-out, a borrow input b-in, and a borrow output b-out. Each of the one-bit add-subtract circuits performs a binary addition of the inputs a and b and the carry input c-in, generating a one-bit sum output s and a one-bit carry output c-out. A one-bit addition that includes a carry input is basically a binary addition of three bits. Accordingly, the sum can be 00, 01, 10 or 11. The least significant bit of this sum is the sum output s, and the most significant bit of the sum is the carry output c-out.

Each one-bit circuit also performs a one-bit subtraction of the inputs a and b, taking into account the one-bit borrow input b-in. The subtraction performed: is a−[b+(b−in)]. The sum of b and the borrow input can have values 00, 01 or 10, and a, of course can have values 0 or 1. If the result of this subtraction is 00 or 01, this is the difference output d and the borrow output b-out is zero. If the result is negative, that is to say b+(b−in) is greater than a, then a borrow is needed and the subtraction performed is [10+a]−[b+(b−in)]. This is the difference d, and the borrow output to the next stage is 1.

The stages 80.1, 80.2 and 80.3 are connected appropriately to cascade the carry and borrow signals from one stage to the next. The c-out and b-out signals from the first stage 80.1 are connected as the c-in and b-in signals to the second stage 80.2. Likewise, the c-out and b-out signals from the second stage 80.2 are connected as the c-in and b-in signals to the third stage 80.3. The c-out and b-out signals from the third stage 80.3 are gated into flip-flops 86 and 88, the outputs of which are fed back as inputs to respective ones of the multiplexers 82 and 84. It will be recalled that the add-subtract unit of FIG. 5a operates on numerical data three bits at a time. Therefore, the carry and borrow signals must be preserved for use with the next set of three bits in a computation. The only time that the carry and borrow outputs of last stage 80.3 are not needed is when the three bits being manipulated are the most significant in the numerical quantities being added and subtracted.

A strobe signal on line 94 indicates when the least significant three bits are being processed. In one condition of the strobe signal, which is used to control the multiplexers 82 and 84, the carry and borrow outputs from the third stage 80.3 are selected in the multiplexers and gated into flip-flops 90 and 92, for use as carry and borrow inputs in the first stage 80.1. In the other state of the strobe signal, when the least significant three bits are being processed, an lsb signal (usually zero) on line 96 is selected by the multiplexers and gated into flip-flops 90 and 92.

Figure 5B:
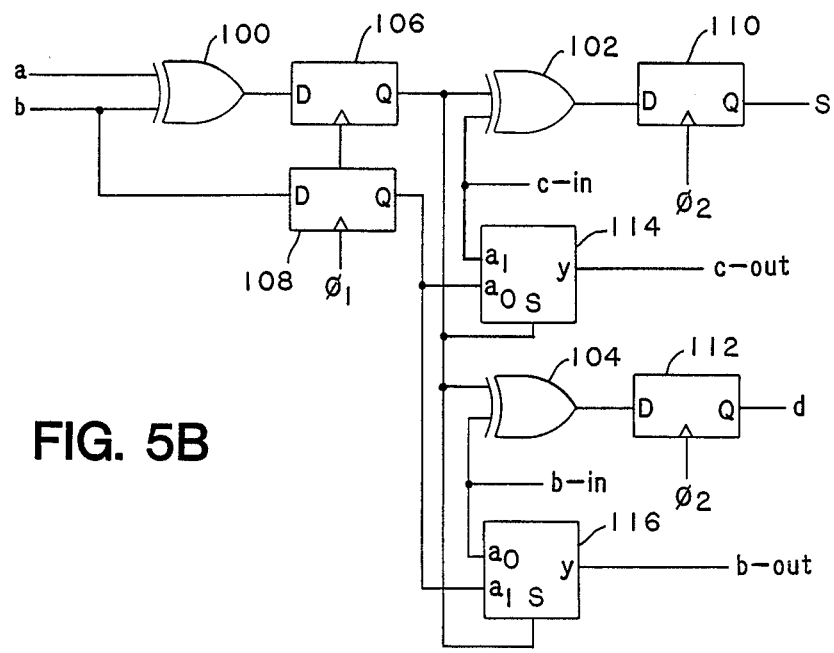

Each add-subtract circuit 80.1, 80.2, 80.3 is shown in more detail in FIG. 5b. The circuit includes three exclusive OR (XOR) gates 100, 102 and 104, four flip-flops 106, 108, 110 and 112, and two multiplexers 114 and 116.

The a and b inputs are applied as inputs to XOR gate 100, and the output of the XOR gate is applied as the input to flip-flop 106. The b input is also connected as the input of flip-flop 108. The output of flip-flop 106 is connected as an input to XOR gate 102. The input of this XOR gate is the c-in signal, which is also connected as one input to multiplexer 114. The other input to the multiplexer 114 is derived from the output of flip-flop 108, while the strobe input for the multiplexer 114 is the output of flip-flop 106. The output of the multiplexer 114 is the c-out signal. The output of XOR gate 102 is input to flop-flop 110, the output of which is the sum signal s.

Generation of the difference and borrow output signals employ an analogous structure including XOR gate 104, flip-flop 112 and multiplexer 116. Specifically, XOR gate 104 derives its inputs from flip-flop 106 and from the b-in signal, which is also connected as an input to multiplexer 116. The input of multiplexer 116 is obtained from flip-flop 108, and the strobe signal is obtained from the flip-flop 106. The output of XOR gate 104 is applied as the input to flip-flop 112, which outputs the difference signal d. The borrow output b-out is obtained from the output of the multiplexer 116.

The truth tables for one-bit addition and subtraction are as follows:

| Addition: | a | b | c-in | s | c-out | a XOR b |
|---|---|---|---|---|---|---|
| | 0 | 0 | 0 | 0 | 0 | 0 |
| | 0 | 0 | 1 | 1 | 0 | 0 |
| | 0 | 1 | 0 | 1 | 0 | 1 |
| | 0 | 1 | 1 | 0 | 1 | 1 |
| | 1 | 0 | 0 | 1 | 0 | 1 |
| | 1 | 0 | 1 | 0 | 1 | 1 |
| | 1 | 1 | 0 | 0 | 1 | 0 |
| | 1 | 1 | 1 | 1 | 1 | 0 |
| Subtraction: | a | b | b-in | d | b-out | a XOR b |
| | 0 | 0 | 0 | 0 | 0 | 0 |
| | 0 | 0 | 1 | 1 | 1 | 0 |
| | 0 | 1 | 0 | 1 | 1 | 1 |
| | 0 | 1 | 1 | 0 | 1 | 1 |
| | 1 | 0 | 0 | 1 | 0 | 1 |
| | 1 | 0 | 1 | 0 | 0 | 1 |
| | 1 | 1 | 0 | 0 | 0 | 0 |
| | 1 | 1 | 1 | 1 | 1 | 0 |

The exclusive OR of the two inputs a and b provides the one-bit sum of those quantities from XOR gate 106. When this result is XORed with the carry input c-in, in XOR gate 102, this provides the sum output s. Generation of the carry output c-out is based on the observation from the truth table that, when the exclusive OR of a and b is 0, c-out is equal to b (or a). When the exclusive OR of a and b is 1, c-out is equal to c-in. Multiplexer 114 is controlled by the output of flip-flop 106, which contains the exclusive OR of a and b. When this strobe control signal is 0, the multiplexer 114 selects the b signal for output as c-out. When the strobe is a 1, the multiplexer selects c-in for output as c-out.

It can be confirmed from the truth table that the difference signal d can be derived by taking the exclusive OR of the inputs a and b, and then the exclusive OR of the result and the borrow input b-in. Also when the exclusive OR of a and b is 0, the borrow output b-out is equal to the borrow input b-in, and when the exclusive OR of a and b is 1, the borrow output b-out is equal to the b input value. Therefore, multiplexer 116 selects the appropriate b-out value.

Interleaver and Deinterleaver

A more difficult aspect of the invention from the point of view of explanation is the interleaving operation to convert data words to three-bit serial format, and the corresponding deinterleaving operation to return the data to a conventional bit-parallel format. In Table 2(i)–(v), the following convention is used to indicate the real and imaginary components of the signals being processed. Each data word is designated in the general form rNx or iNx, where:

r and i indicate the real and imaginary components, respectively,

N is the data word number (0–7), and x=a, b, ... h, where a=bits 0–2, b=bits 3–5 and so forth, and h=bits 21–23.

TABLE 2

(i) - Input to Interleaver

| | | | | | | | | | | | | | | | |
|---|---|---|---|---|---|---|---|---|---|---|---|---|---|---|---|
| i0h | r0h | i4h | r4h | i2h | r2h | i6h | r6h | i1h | r1h | i5h | r5h | i3h | r3h | i7h | r7h |
| i0g | r0g | i4g | r4g | i2g | r2g | i6g | r6g | i1g | r1g | i5g | r5g | i3g | r3g | i7g | r7g |
| i0f | r0f | i4f | r4f | i2f | r2f | i6f | r6f | i1f | r1f | i5f | r5f | i3f | r3f | i7f | r7f |
| i0e | r0e | i4e | r4e | i2e | r2e | i6e | r6e | i1e | r1e | i5e | r5e | i3e | r3e | i7e | r7e |
| i0d | r0d | i4d | r4d | i2d | r2d | i6d | r6d | i1d | r1d | i5d | r5d | i3d | r3d | i7d | r7d |
| i0c | r0c | i4c | r4c | i2c | r2c | i6c | r6c | i1c | r1c | i5c | r5c | i3c | r3c | i7c | r7c |
| i0b | r0b | i4b | r4b | i2b | r2b | i6b | r6b | i1b | r1b | i5b | r5b | i3b | r3b | i7b | r7b |
| i0a | r0a | i4a | r4a | i2a | r2a | i6a | r6a | i1a | r1a | i5a | r5a | i3a | r3a | i7a | r7a |

(ii) - After First Conversion Stage

| | | | | | | | | | | | | | | | |
|---|---|---|---|---|---|---|---|---|---|---|---|---|---|---|---|
| r0h | r0g | r4h | r4g | r2h | r2g | r6h | r6g | r1h | r1g | r5h | r5g | r3h | r3g | r7h | r7g |
| i0h | i0g | i4h | i4g | i2h | i2g | i6h | i6g | i1h | i1g | i5h | i5g | i3h | i3g | i7h | i7g |
| r0f | r0e | r4f | r4e | r2f | r2e | r6f | r6e | r1f | r1e | r5f | r5e | r3f | r3e | r7f | r7e |
| i0f | i0e | i4f | i4e | i2f | i2e | i6f | i6e | i1f | i1e | i5f | i5e | i3f | i3e | i7f | i7e |
| r0d | r0c | r4d | r4c | r2d | r2c | r6d | r6c | r1d | r1c | r5d | r5c | r3d | r3c | r7d | r7c |
| i0d | i0c | i4d | i4c | i2d | i2c | i6d | i6c | i1d | i1c | i5d | i5c | i3d | i3c | i7d | i7c |
| r0b | r0a | r4b | r4a | r2b | r2a | r6b | r6a | r1b | r1a | r5b | r5a | r3b | r3a | r7b | r7a |
| i0b | i0a | i4b | i4a | i2b | i2a | i6b | i6a | i1b | i1a | i5b | i5a | i3b | i3a | i7b | i7a |

(iii) - After Second Conversion Stage

| | | | | | | | | | | | | | | | |
|---|---|---|---|---|---|---|---|---|---|---|---|---|---|---|---|
| r4h | r4g | r4f | r4e | r6h | r6g | r6f | r6e | r5h | r5g | r5f | r5e | r7h | r7g | r7f | r7e |
| i4h | i4g | i4f | i4e | i6h | i6g | i6f | i6e | i5h | i5g | i5f | i5e | i7h | i7g | i7f | i7e |
| r0h | r0g | r0f | r0e | r2h | r2g | r2f | r2e | r1h | r1g | r1f | r1e | r3h | r3g | r3f | r3e |
| i0h | i0g | i0f | i0e | i2h | i2g | i2f | i2e | i1h | i1g | i1f | i1e | i3h | i3g | i3f | i3e |
| r4d | r4c | r4b | r4a | r6d | r6c | r6b | r6a | r5d | r5c | r5b | r5a | r7d | r7c | r7b | r7a |
| i4d | i4c | i4b | i4a | i6d | i6c | i6b | i6a | i5d | i5c | i5b | i5a | i7d | i7c | i7b | i7a |
| r0d | r0c | r0b | r0a | r2d | r2c | r2b | r2a | r1d | r1c | r1b | r1a | r3d | r3c | r3b | r3a |
| i0d | i0c | i0b | i0a | i2d | i2c | i2b | i2a | i1d | i1c | i1b | i1a | i3d | i3c | i3b | i3a |

(iv) - After Third Conversion Stage

| | | | | | | | | | | | | | | | |
|---|---|---|---|---|---|---|---|---|---|---|---|---|---|---|---|
| r6h | r6g | r6f | r6e | r6d | r6c | r6b | r6a | r7h | r7g | r7f | r7e | r7d | r7c | r7b | r7a |
| i6h | i6g | i6f | i6e | i6d | i6c | i6b | i6a | i7h | i7g | i7f | i7e | i7d | i7c | i7b | i7a |
| r2h | r2g | r2f | r2e | r2d | r2c | r2b | r2a | r3h | r3g | r3f | r3e | r3d | r3c | r3b | r3a |
| i2h | i2g | i2f | i2e | i2d | i2c | i2b | i2a | i3h | i3g | i3f | i3e | i3d | i3c | i3b | i3a |
| r4h | r4g | r4f | r4e | r4d | r4c | r4b | r4a | r5h | r5g | r5f | r5e | r5d | r5c | r5b | r5a |
| i4h | i4g | i4f | i4e | i4d | i4c | i4b | i4a | i5h | i5g | i5f | i5e | i5d | i5c | i5b | i5a |
| r0h | r0g | r0f | r0e | r0d | r0c | r0b | r0a | r1h | r1g | r1f | r1e | r1d | r1c | r1b | r1a |
| i0h | i0g | i0f | i0e | i0d | i0c | i0b | i0a | i1h | i1g | i1f | i1e | i1d | i1c | i1b | i1a |

(v) - Output from Interleaver

| | | | | | | | | | | | | | | | |
|---|---|---|---|---|---|---|---|---|---|---|---|---|---|---|---|
| r0h | r0g | r0f | r0e | r0d | r0c | r0b | r0a | r1h | r1g | r1f | r1e | r1d | r1c | r1b | r1a |
| r4h | r4g | r4f | r4e | r4d | r4c | r4b | r4a | r5h | r5g | r5f | r5e | r5d | r5c | r5b | r5a |
| i0h | i0g | i0f | i0e | i0d | i0c | i0b | i0a | i1h | i1g | i1f | i1e | i1d | i1c | i1b | i1a |
| i4h | i4g | i4f | i4e | i4d | i4c | i4b | i4a | i5h | i5g | i5f | i5e | i5d | i5c | i5b | i5a |
| r2h | r2g | r2f | r2e | r2d | r2c | r2b | r2a | r3h | r3g | r3f | r3e | r3d | r3c | r3b | r3a |
| r6h | r6g | r6f | r6e | r6d | r6c | r6b | r6a | r7h | r7g | r7f | r7e | r7d | r7c | r7b | r7a |
| i2h | i2g | i2f | i2e | i2d | i2c | i2b | i2a | i3h | i3g | i3f | i3e | i3d | i3c | i3b | i3a |
| i6h | i6g | i6f | i6e | i6d | i6c | i6b | i6a | i7h | i7g | i7f | i7e | i7d | i7c | i7b | i7a |

TABLE 3

(i) - Rearranged Input to Deinterleaver

| | | | | | | | | | | | | | | | |
|---|---|---|---|---|---|---|---|---|---|---|---|---|---|---|---|
| r0h | r0g | r0f | r0e | r0d | r0c | r0b | r0a | r2h | r2g | r2f | r2e | r2d | r2c | r2b | r2a |
| i0h | i0g | i0f | i0e | i0d | i0c | i0b | i0a | i2h | i2g | i2f | i2e | i2d | i2c | i2b | i2a |
| r4h | r4g | r4f | r4e | r4d | r4c | r4b | r4a | r6h | r6g | r6f | r6e | r6d | r6c | r6b | r6a |
| i4h | i4g | i4f | i4e | i4d | i4c | i4b | i4a | i6h | i6g | i6f | i6e | i6d | i6c | i6b | i6a |
| r1h | r1g | r1f | r1e | r1d | r1c | r1b | r1a | r3h | r3g | r3f | r3e | r3d | r3c | r3b | r3a |
| i1h | i1g | i1f | i1e | i1d | i1c | i1b | i1a | i3h | i3g | i3f | i3e | i3d | i3c | i3b | i3a |
| r5h | r5g | r5f | r5e | r5d | r5c | r5b | r5a | r7h | r7g | r7f | r7e | r7d | r7c | r7b | r7a |
| i5h | i5g | i5f | i5e | i5d | i5c | i5b | i5a | i7h | i7g | i7f | i7e | i7d | i7c | i7b | i7a |

(ii) - After First Conversion Stage

| | | | | | | | | | | | | | | | |
|---|---|---|---|---|---|---|---|---|---|---|---|---|---|---|---|
| r0h | r0g | r0f | r0e | r0d | r0c | r0b | r0a | r1h | r1g | r1f | r1e | r1d | r1c | r1b | r1a |
| i0h | i0g | i0f | i0e | i0d | i0c | i0b | i0a | i1h | i1g | i1f | i1e | i1d | i1c | i1b | i1a |
| r4h | r4g | r4f | r4e | r4d | r4c | r4b | r4a | r5h | r5g | r5f | r5e | r5d | r5c | r5b | r5a |
| i4h | i4g | i4f | i4e | i4d | i4c | i4b | i4a | i5h | i5g | i5f | i5e | i5d | i5c | i5b | i5a |
| r2h | r2g | r2f | r2e | r2d | r2c | r2b | r2a | r3h | r3g | r3f | r3e | r3d | r3c | r3b | r3a |
| i2h | i2g | i2f | i2e | i2d | i2c | i2b | i2a | i3h | i3g | i3f | i3e | i3d | i3c | i3b | i3a |
| r6h | r6g | r6f | r6e | r6d | r6c | r6b | r6a | r7h | r7g | r7f | r7e | r7d | r7c | r7b | r7a |
| i6h | i6g | i6f | i6e | i6d | i6c | i6b | i6a | i7h | i7g | i7f | i7e | i7d | i7c | i7b | i7a |

(iii) - After Second Conversion Stage

| | | | | | | | | | | | | | | | |
|---|---|---|---|---|---|---|---|---|---|---|---|---|---|---|---|
| r0h | r0g | r0f | r0e | r2h | r2g | r2f | r2e | r1h | r1g | r1f | r1e | r3h | r3g | r3f | r3e |
| i0h | i0g | i0f | i0e | i2h | i2g | i2f | i2e | i1h | i1g | i1f | i1e | i3h | i3g | i3f | i3e |

TABLE 3-continued

| | | | | | | | | | | | | | | | |
|---|---|---|---|---|---|---|---|---|---|---|---|---|---|---|---|
| r4h | r4g | r4f | r4e | r6h | r6g | r6f | r6e | r5h | r5g | r5f | r5e | r7h | r7g | r7f | r7e |
| i4h | i4g | i4f | i4e | i6h | i6g | i6f | i6e | i5h | i5g | i5f | i5e | i7h | i7g | i7f | i7e |
| r0d | r0c | r0b | r0a | r2d | r2c | r2b | r2a | r1d | r1c | r1b | r1a | r3d | r3c | r3b | r3a |
| i0d | i0c | i0b | i0a | i2d | i2c | i2b | i2a | i1d | i1c | i1b | i1a | i3d | i3c | i3b | i3a |
| r4d | r4c | r4b | r4a | r6d | r6c | r6b | r6a | r5d | r5c | r5b | r5a | r7d | r7c | r7b | r7a |
| i4d | i4c | i4b | i4a | i6d | i6c | i6b | i6a | i5d | i5c | i5b | i5a | i7d | i7c | i7b | i7a |
| (iv) - After Third Conversion Stage | | | | | | | | | | | | | | | |
| r0h | r0g | r4h | r4g | r2h | r2g | r6h | r6g | r1h | r1g | r5h | r5g | r3h | r3g | r7h | r7g |
| i0h | i0g | i4h | i4g | i2h | i2g | i6h | i6g | i1h | i1g | i5h | i5g | i3h | i3g | i7h | i7g |
| r0f | r0e | r4f | r4e | r2f | r2e | r6f | r6e | r1f | r1e | r5f | r5e | r3f | r3e | r7f | r7e |
| i0f | i0e | i4f | i4e | i2f | i2e | i6f | i6e | i1f | i1e | i5f | i5e | i3f | i3e | i7f | i7e |
| r0d | r0c | r4d | r4c | r2d | r2c | r6d | r6c | r1d | r1c | r5d | r5c | r3d | r3c | r7d | r7c |
| i0d | i0c | i4d | i4c | i2d | i2c | i6d | i6c | i1d | i1c | i5d | i5c | i3d | i3c | i7d | i7c |
| r0b | r0a | r4b | r4a | r2b | r2a | r6b | r6a | r1b | r1a | r5b | r5a | r3b | r3a | r7b | r7a |
| i0b | i0a | i4b | i4a | i2b | i2a | i6b | i6a | i1b | i1a | i5b | i5a | i3b | i3a | i7b | i7a |
| (v) - Output from Deinterleaver | | | | | | | | | | | | | | | |
| i0h | r0h | i4h | r4h | i2h | r2h | i6h | r6h | i1h | r1h | i5h | r5h | i3h | r3h | i7h | r7h |
| i0g | r0g | i4g | r4g | i2g | r2g | i6g | r6g | i1g | r1g | i5g | r5g | i3g | r3g | i7g | r7g |
| i0f | r0f | i4f | r4f | i2f | r2f | i6f | r6f | i1f | r1f | i5f | r5f | i3f | r3f | i7f | r7f |
| i0e | r0e | i4e | r4e | i2e | r2e | i6e | r6e | i1e | r1e | i5e | r5e | i3e | r3e | i7e | r7e |
| i0d | r0d | i4d | r4d | i2d | r2d | i6d | r6d | i1d | r1d | i5d | r5d | i3d | r3d | i7d | r7d |
| i0c | r0c | i4c | r4c | i2c | r2c | i6c | r6c | i1c | r1c | i5c | r5c | i3c | r3c | i7c | r7c |
| i0b | r0b | i4b | r4b | i2b | r2b | i6b | r6b | i1b | r1b | i5b | r5b | i3b | r3b | i7b | r7b |
| i0a | r0a | i4a | r4a | i2a | r2a | i6a | r6a | i1a | r1a | i5a | r5a | i3a | r3a | i7a | r7a |

Accordingly, the first data word to be input, which is the real component of X7, is indicated as r7a, r7b, r7c, and so forth up to r7h. Table 2(i) shows the data in accordance with this convention, in the order in which it arrives at the interleaver. Another convention is that the table is to be read from right to left for increasing time. Each row of the table can be thought of as a three-bit data line, with the data items on the line moving from left to right. Table 2(i) will be recognized as defining a conventional bit-parallel, word-serial format. Each column represents a single input word of twenty-four bits, with the right-most column arriving at the interleaver first and the left-most column arriving last. It will also be recognized that the order of the input words is backwards-bit-reversed. This order is obtained by taking the binary representations of the numbers 0–7, reversing the order of the bits within each binary representation, converting these binary numbers back to decimal, and taking them in reverse order. The natural order numerals 0–7 become 0, 4, 2, 6, 1, 5, 3, 7 when bit-reversed, and 7, 3, 5, 1, 6, 2, 4, 0 when backwards-bit-reversed.

Table 2(v) represents the output of the interleaver using the same conventions of nomenclature as Table 2(i). Again, the eight rows of the table represent eight three-bit lines, and the sixteen columns represent sixteen clock cycles of operation. It will be observed that the first eight clock cycles result in the output of eight data words: r1, r5, i1, i5, r3, r7, i3 and i7, and that each of these words is output three bits per clock cycle, from the least-significant to the most-significant bits. The next eight clock cycles result in the output of the eight remaining data words: r0, r4, i0, i4, r2, r6, i2 and i6.

This conversion from the format in Table 2(i) to the format in Table 2(v) is performed in three conversion stages, followed by a reordering of data words effected by a wiring change. In the first stage, the data words are rearranged such that there are six-bit segments appearing on each three-bit line. The result is shown in Table 2(ii). In the next stage, the data words are segmented in twelve-bit segments on each line, as shown in Table 2(iii). The final conversion stage is from the one shown in Table 2(iii) to the interleaved output stage of Table 2(iv). There is a final resequencing stage from Table 2(iv) to Table 2(v), but this involves only reordering some of the wires to provide the desired input sequence.

The interleaver hardware employed to implement these three stages is similar in some respects to the commutation stage of the DFT kernel shown in FIG. 3. An exemplary cell of the interleaver hardware is shown in FIGS. 6a–6e. These figures illustrate the processing of the first few clock cycles for the two upper lines of the interleaver, the ones represented by the two upper lines of input in Table 2(i). The interleaver cell has two input lines 120 and 122, two output lines 124 and 126, and a commutator switch 128 that is either in the "straight-through" condition or the "criss-cross" condition, and two storage delays 130 and 132 installed in one input line 120 and the corresponding output line 124. The delays are each of one clock cycle, and it will be understood that the input and output lines are all three-bit lines. In operation of the interleaver, the time delay provided by each storage delay 130, 132 is equivalent to the time that commutator switch 128 remains in the same switching state.

Figure 6A:
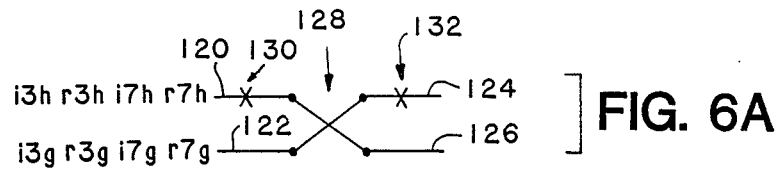
FIGS. 6a–6e represent a block diagram of one processing cell of the interleaver of the invention.
Figure 6B:
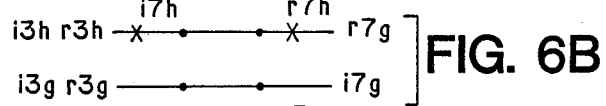
Figure 6C:
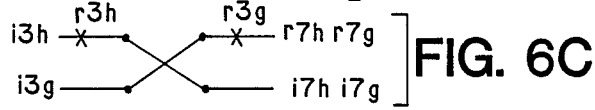
Figure 6D:
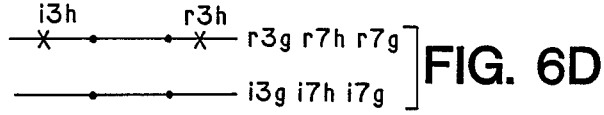
Figure 6E:
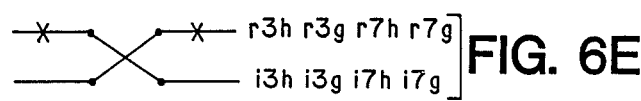

In FIG. 6a, the switch 128 is in the criss-cross condition and the first three bits have been clocked into the delays. Therefore, delay 130 holds r7h and delay 132 holds r7g. In the next clock cycle, as shown in FIG. 6b, the switch is changed to the straight-through condition and the quantities r7g and i7g emerge at the outputs of the cell. FIGS. 6c through 6e show the conditions at the next three clock cycles, and it will be observed that the outputs contain six-bit segments for each word, consistent with Table 2(ii). The remainder of the first conversion stage includes similar interleaver cells for the other six lines of input data.

The second stage of conversion is analogous to the first and uses similar hardware, but involves slightly different timing considerations. This stage involves conversion from six-bit input segments to twelve-bit output segments. Since each input segment takes two clock cycles to enter a delay, the delays in the second stage are two-cycle delays, and the commutator switches are toggled back and forth every two clock cycles instead of every cycle. The third stage is analogous to the first two, but converts twelve-bit input segments to twenty-four-bit output segments. Accordingly, the delays used are four-cycle delays. The result is the interleaved output shown in Table 2(iv) and reordered in Table 2(v).

The deinterleaving process is shown by way of comparison in Table 3. The process is basically the inverse of the interleaving one, except that a fourth stage is added to provide the outputs in backwards-bit-reversed order again. Table 3(i) shows the DFT results after rearrangement of the order as received from the DFT kernel. Tables 3(ii) through 3(v) show the results after the successive conversion stages, with Table 3(v) showing the format of the deinterleaver output, which is identical to the interleaver input format of Table 2(i).

Butterfly Module Control

Figure 7:
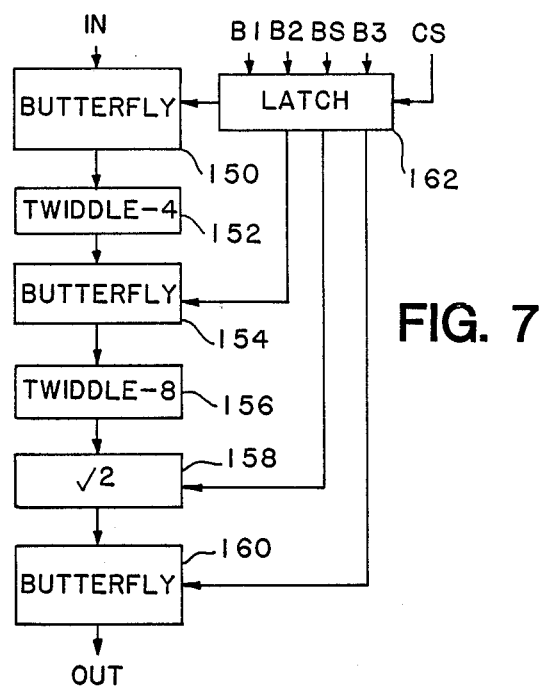
FIG. 7 is a simplified block diagram showing how butterfly stages of the DFT kernel may be selectively bypassed.

FIG. 7 shows the DFT kernel as including a first butterfly stage 150, a four-point twiddle stage 152, a second butterfly stage 154, an eight-point twiddle stage 156, an additional twiddle multiplier stage 158 to effect multiplication by the square root of two, and a third butterfly stage 160. A latch 162 has four stages designated B1, B2, BS, and B3, providing control outputs to the first butterfly stage 150, the second butterfly stage 154, the square root multiplier stage 158, and the third butterfly stage 160, respectively.

The latch 162 is used to designate which, if any, of the butterfly stages and the square-root multiplier stage are to be bypassed. If none are bypassed, the kernel performs as an eight-point DFT as previously described. To operate the kernel in a four-sample DFT mode, the first or the last butterfly stage 150 or 160 is bypassed, allowing the kernel to compute two four-sample DFTs simultaneously.

If the first butterfly stage 150 is by-passed, data must be input as interleaved samples and will leave as two contiguous blocks of data. If the last stage 160 is by-passed, data must be input as two contiguous blocks and will be output in an interleaved format. The square-root multiplier 158 is bypassed for all of the shorter-length DFT modes.

The DFT kernel operate in a two-sample mode if all except one of the butterfly stages are bypassed. Data reordering within the eight-sample data blocks will depend upon which butterfly stages are bypassed.

If all of the butterfly stages are bypassed, no DFT arithmetic is performed on each block of eight input samples. This is basically a one-sample DFT. The twiddle factor multiplications will, however, cause the data to be reordered within each block, and the samples will be normalized to the same exponent value.

It will be appreciated that the ability to selectively bypass the butterfly modules provides greater flexibility in structuring complex FFTs of various sample lengths and is also useful for diagnostic and testing purposes.

It will be appreciated from the foregoing that the present invention represents a significant advance in the field of fast Fourier transforms. In particular, the invention provides a novel approach to structuring a DFT kernel for operation in three-bit-serial format, resulting in a simple but high-speed circuit that can be conveniently cascaded for performing FFTs of higher order. The circuit includes conversion modules for changing the format of the data words from bit-parallel to three-bit-serial, and vice versa. It will also be appreciated that, although a specific embodiment of the invention has been described in detail for purposes of illustration, various modifications may be made without departing from the spirit and scope of the invention. Accordingly, the invention is not to be limited except as by the amended claims.

We claim:

1. A complex N-point discrete Fourier transform circuit operating in an n-bit serial format, comprising:
   a first stage of butterfly modules for performing a complex N/2-point DFT on data entering the circuit in backwards-bit-reversed order and in two serial sets of N data words;
   a commutation stage for holding intermediate results of the first stage and performing multiplications on selected ones of the intermediate results; and
   a final stage of butterfly modules for performing two 2-point DFTs on the intermediate results, to produce a complex N-point DFT in two serial sets of N output words, still in n-bit serial format;
   and wherein the commutation stage is switched after the input of the first N data words, to effect appropriate combination of the intermediate results to produce output of a first set of N output words, and is switched again after the second set is input, to effect appropriate combination of intermediate results to produce output of the second set of output words.

2. A discrete Fourier transform circuit as defined in claim 1, wherein:
   the first stage includes s ranks of N/2 butterfly modules, of which the last rank produces N/2 sum signals and N/2 difference signals, and wherein s is the base-two logarithm of N/2.

3. A discrete Fourier transform circuit as set forth in claim 1, wherein:
   the first stage includes two ranks of N/2 butterfly modules, of which the second rank produces N/2 sum signals and N/2 difference signals; and
   the commutation stage includes a first set of N/2 delay registers installed one in each of N/2 of the sum and difference signal lines, N/2 commutator switches installed in the sum and difference lines, and switchable between a first position in which a sum and difference signals are not interchanged, and a second condition in which the sum and difference signals are interchanged, and a second set of N/2 delay registers installed in N/2 of the sum and difference lines, after connection through the commutator switches.

4. A discrete Fourier transform circuit as set forth in claim 3, wherein:
   some of the second set of delay registers also perform a multiplication function; and
   additional multiplication is effected by means of line interchanging and another butterfly module.

5. A discrete Fourier transform circuit as defined in claim 3, and further comprising:
   means for selectively bypassing butterfly modules to effect processing of DFTs of shorter length.

6. A discrete Fourier transform circuit as defined in claim 5, and further comprising:
   means for selectively bypassing a commutator switch to preserve data sequencing properties in the processing of DFTs of shorter length.

7. A discrete Fourier transform circuit as set forth in claim 1, and further Comprising:
   an interleaver conversion module for converting from a bit-parallel data format to an n-bit-serial format before computation of the discrete Fourier transform; and a deinterleaver conversion module for converting from an n-bit-serial data format to a bit-parallel format after computation of the discrete Fourier transform.

8. A discrete Fourier transform circuit as set forth in claim 7, and further comprising:
a floating-point to fixed-point conversion module to convert incoming data to fixed-point format before conversion to n-bit-serial; and
a fixed-point to floating-point conversion module to convert outgoing data to floating-point format after conversion back to bit-parallel.

9. A complex eight-point discrete Fourier transform circuit operating in a three-bit-serial format, comprising:
a first stage of butterfly modules for performing a complex four-point DFT on data entering the circuit in backwards-bit-reversed order and in two serial sets of eight data words;
a commutator stage for holding intermediate results of the first stage and performing multiplications on selected ones of the intermediate results; and
a final stage of butterfly modules for performing two two-point DFTs on the intermediate results, to produce a complex eight-point DFT in two serial sets of eight output words, still in three-bit-serial format;
and wherein the commutation stage is switched after the input of the first eight data words, to effect appropriate combination of the intermediate results to produce output of a first set of eight output words, and is switched again after the second set is input, to effect appropriate combination of intermediate results to produce output of the second set of output words.

10. A discrete Fourier transform circuit as set forth in claim 9, wherein:
the first stage includes two ranks of four butterfly modules, of which the second rank produces four sum signals and four difference signals; and
the commutation stage includes a first set of four delay registers installed one in each of four of the sum and difference signal lines, four commutator switches installed in the sum and difference lines, and switchable between a first position in which a sum and difference signals are not inter changed, and a second condition in which the sum and difference signals are interchanged, and a second set of four delay registers installed in four of the sum and difference lines, but after connection through the commutator switches.

11. A discrete Fourier transform circuit as set forth in claim 10, wherein:
two of the second set of delay registers also perform a multiplication function; and
additional multiplication is effected by means of line interchanging and another butterfly module.

12. A discrete Fourier transform circuit as set forth in claim 9, and further comprising:
an interleaver conversion module for converting from a bit-parallel data format to an three-bit-serial format before computation of the discrete Fourier transform; and
a deinterleaver conversion module for converting from an three-bit-serial data format to a bit-parallel format after computation of the discrete Fourier transform.

13. A discrete Fourier transform circuit as set forth in claim 12, wherein:
the deinterleaver includes means for permuting the order of the output data to an order selected for convenience in overall system design.

14. A discrete Fourier transform circuit as set forth in claim 13, wherein:
the means for permuting the order of the output data permutes the data to a backwards-bit-reversed format.

15. A discrete Fourier transform circuit as set forth in claim 12, and further comprising:
a floating-point to fixed-point conversion module to convert incoming data to fixed-point format before conversion to three-bit-serial; and
a fixed-point to floating-point conversion module to convert outgoing data to floating-point format after conversion back to bit-parallel.

16. A discrete Fourier transform circuit as defined in claim 10, and further comprising:
means for selectively bypassing butterfly and commutator modules to effect processing of DFTs of shorter length.

17. A complex N-point discrete Fourier transform circuit operating in an n-bit serial format, comprising:
a first stage of butterfly modules for performing a complex $N_1$-point DFT on data entering the circuit in backwards-bit-reversed order and in two serial sets of N data words;
a commutation stage for holding intermediate results of the first stage and performing multiplications on selected ones of the intermediate results; and
a final stage of butterfly modules for performing two $N_2$-point DFTs on the intermediate results, where $N_1 \times N_2 = N$, to produce a complex N-point DFT in two serial sets of N output words, still in n-bit serial format;
and wherein the commutation stage is switched after the input of the first N data words, to effect appropriate combination of the intermediate results to produce output of a first set of N output words, and is switched again after the second set is input, to effect appropriate combination of intermediate results to produce output of the second set of output words.

18. A method of processing in an eight-sample complex discrete Fourier transform, comprising the steps of:
converting sixteen input data words from bit-parallel format to three-bit-serial format;
inputting the first eight of the input data words into a four-point DFT;
storing intermediate results from the first four-point DFT operation in storage devices, some of which effect multiplication of the intermediate results by twiddle factors;
switching the configuration of a commutation stage from a first condition to a second condition prior to beginning a second phase of processing;
inputting the second eight of the input data words into the four-point DFT;
transmitting selected items of intermediate results from the first and second four-point DFT operations to a final DFT stage, to generate a first set of eight output data words from the circuit;
switching the configuration of the commutation stage from the second condition back to the first condition;

transmitting others of the intermediate results to the final DFT stage to produce the second set of eight output data words; and converting the output data words back to bit-parallel format.

19. A method as defined in claim 18, wherein:

the recited steps of the method have the effect of overlapping processing of consecutive sets of data, and generation of the second set of output data words proceeds simultaneously with the generation of intermediate results from a subsequent first set of data words.

20. A method as defined in claim 18, and further including the steps of:

converting input data from floating-point to fixed-point prior to conversion to three-bit-serial format; and converting the output data from fixed-point to floating-point after conversion back to bit-parallel format.

21. A method as defined in claim 18, wherein:

the steps of inputting data operate on the data words in backwards-bit-reversed order; and output data words are also arranged in backwards-bit-reversed order.

22. A method of processing in an N-sample complex discrete Fourier transform, comprising the steps of:

converting 2N input data words from bit-parallel format to n-bit-serial format;

inputting the first N of the input data words into a first-stage DFT;

storing intermediate results from the first DFT operation in storage devices, some of which effect multiplication of the intermediate results by twiddle factors;

switching the configuration of a commutation stage from a first condition to a second condition prior to beginning a second phase of processing;

inputting the second N of the input data words into the first-stage DFT;

transmitting selected items of intermediate results from the first and second DFT operations to a final DFT stage, to generate a first set of N output data words from the circuit;

switching the configuration of the commutation stage from the first condition to the second condition;

transmitting others of the intermediate results to the final DFT stage to produce the second set of N output data words; and converting the output data words back to bit-parallel format.

23. A method as defined in claim 22, wherein:

the recited steps of the method have the effect of overlapping processing of consecutive sets of data, and generation of the second set of output data words proceeds simultaneously with the generation of intermediate results from a subsequent first set of data words.

24. A complex N-point discrete Fourier transform circuit operating in an n-bit serial format, comprising:

(1) a first DFT stage for performing a complex N/2-point DFT on data entering the circuit in backwards-bit-reversed order and in two serial sets of N data words;

(2) a commutation stage for holding intermediate results of the first stage (1) and performing multiplications on selected ones of the intermediate results; and (3) a final DFT stage of butterfly modules for performing two 2-point DFTs on the intermediate results, to produce a complex N-point DFT in two serial sets of N output words, still in n-bit serial format;

wherein the commutation stage is switched after the input of the first N data words, to effect appropriate combination of the intermediate results to product output of a first set of N output words, and is switched again after the second set input, to effect appropriate combination of intermediate results to produce output of the second set of output words;

and wherein the first DFT stage (1) is itself a discrete Fourier transform circuit of the type set forth in claim 1, including (1.1) an initial DFT stage, for performing a complex N/4-point DFt on data entering this stage in backwards-bit-reversed order and in two serial sets of N/2 data words, (1.2) a commutation stage for holding intermediate results from within the initial stage (1.1) and performing multiplications on selected ones of the intermediate results, and (1.3) a final DFT stage, within the first stage (1.1) of the entire circuit, for performing two 2-point DFTs on the intermediate results, to produce a complex N/2-point DFT in two serial sets of N/2 output words, still in n-bit serial format, and wherein the commutation stage (1.2) is switched after the input of the first N/2 data words, to effect appropriate combination of the intermediate results to produce output of a first set of N/2 output words, and is switched again after the second set is input, to effect appropriate combination of intermediate results to produce output of the second set of output words.

* * * * *